United States Patent [19]
McConnell et al.

[11] Patent Number: 5,251,183
[45] Date of Patent: Oct. 5, 1993

[54] APPARATUS AND METHOD FOR MARINE SEISMIC SURVEYING UTILIZING ADAPTIVE SIGNAL PROCESSING

[76] Inventors: Joseph R. McConnell, 2910 Grantslake #804, Sugar Land, Tex. 77479; George Wood, 4106 Sugar Crossing Ct., Sugar Land, Tex. 77478

[21] Appl. No.: 910,601
[22] Filed: Jul. 8, 1992
[51] Int. Cl.⁵ .......................... G01V 1/38; G01V 1/36
[52] U.S. Cl. ........................................... 367/21; 367/45
[58] Field of Search ..................... 367/20, 21, 24, 43, 367/63, 38, 45

[56] References Cited

U.S. PATENT DOCUMENTS

| | | | |
|---|---|---|---|
| 3,867,712 | 2/1975 | Harthill et al. | 367/118 |
| 4,207,624 | 6/1980 | Dentino et al. | 367/135 |
| 4,556,962 | 12/1985 | Widrow | 367/45 |
| 4,566,083 | 1/1986 | Thigpen | 367/21 |
| 4,570,245 | 2/1986 | Thigpen | 367/15 |
| 4,581,723 | 4/1986 | Savit | 367/20 |
| 4,821,241 | 4/1989 | Berglund | 367/20 |
| 4,890,264 | 12/1989 | Crews et al. | 367/45 |

Primary Examiner—Ian J. Lobo
Attorney, Agent, or Firm—Arnold, White & Durkee

[57] ABSTRACT

A method and apparatus for attenuating bulge wave noise from data recorded by seismic streamers is provided. The apparatus includes a marine seismic streamer having a seismic detector and an accelerometer. The accelerometer is secured between the lead-in section and the seismic detector. Intra-shot and inter-shot accelerometer and seismic detector signals are recorded. The method utilizes inter-shot and an intra-shot adaptive processing loops. The inter-shot adaptive processing loop derives inter-shot complex weights from inter-shot accelerometer signals and inter-shot seismic detector signals. The intra-shot adaptive processing loop models bulge wave noise in the intra-shot seismic detector signals by combining the inter-shot complex weights with intra-shot accelerometer signals. Bulge wave noise attenuation is achieved by subtracting the intra-shot bulge wave noise model from the intra-shot seismic detector signals.

10 Claims, 4 Drawing Sheets

APPARATUS AND METHOD FOR MARINE SEISMIC SURVEYING UTILIZING ADAPTIVE SIGNAL PROCESSING

FIELD OF THE INVENTION

The present invention relates in general to the field of marine seismic surveying and in particular to the apparatus and the process of marine seismic surveying utilizing towed seismic streamers. Still more particularly, the present invention relates to an apparatus and method for enhancing the resolution of seismic data recorded by such streamers by attenuating from such recorded data, signals resulting from bulge wave and related energy propagating within the streamer.

BACKGROUND OF THE INVENTION

Seismic surveying typically involves the utilization of a source of seismic energy and one or more arrays of seismic detectors. The arrays of seismic detectors are selectively positioned above an area of interest. Seismic waves generated by a seismic energy source are reflected and refracted by sub-surface geological formations and recorded by the seismic detectors.

The source of seismic energy typically utilized for land based operations may be an apparatus capable of delivering a series of impacts or mechanical vibrations to the surface of the earth or the detonation of a high explosive charge near the earth's surface. The resultant acoustic waves which are generated in the earth, including those which are reflected and refracted by the various interfaces within the formations of the earth, are converted by the seismic detectors into representative electrical signals. From these electrical signals, data may be deduced concerning the structure of the strata beneath the earth's surface.

Marine seismic surveying operates in much the same manner. An explosive device or vibration inducing compressed air system is typically utilized to generate seismic energy. The seismic energy then propagates as seismic waves into the earth formations below the body of water. Reflections and refractions of this seismic energy from the various strata within the earth are then detected by preferably a plurality of seismic detectors which are generally coupled together in one or more "live sections" of a sensor array which are towed behind a marine craft. It is common to employ a plurality of sensor arrays, each of which may contain over 10,000 seismic detectors. Further, multiple arrays are often towed in both a vertically spaced as well as in a horizontally spaced alignment.

The sensor array, or "streamer" generally includes a lead-in section, the live section and a tailbouy section. The lead-in section is positioned between the marine vessel and the first live section. When surveying with two or more streamers, barovanes may be inserted between the marine vessel and the lead-in section to achieve desired streamer spacing. The tailbouy lead-out is positioned between the free end of the last live section and the tailbouy.

Typically, "stretch" sections which are made of elastic materials, such as nylon or KEVLAR, are inserted between the lead-in section and the first live section and between the last live section and the tailbouy lead-out. The active section of the streamer generally consists of a fluid filled, elongated, flexible, tubular plastic jacket. The plurality of seismic detectors and other associated recording hardware are internally positioned along the length of the plastic jacket. Donut-shaped spacers are positioned at regular intervals within the plastic jacket. Each spacer fits snugly against the inside wall of the plastic jacket. Electrical and stress conduits, which are secured to and traverse these spacers, generally extend the full length of the live section.

A problem in all forms of marine seismic surveying operations is the presence of marine ambient noise. Different sources of marine ambient noise which occur during these operations include acceleration of the streamer during towing, vibration of the barovanes during towing, vibrations of the marine vessel (on board engines, generators, compressors, etc.), vibrations of nearby drilling rigs or passing ships, pressure variations caused by gravity waves propagating at the ocean surface, and turbulent, non-laminar water flow around the streamer. Of particular interest to the inventors is the general class of marine noise commonly referred to as "bulge wave noise". Bulge wave noise generally results from erratic lurching of the marine vessel, the barovanes and tailbouy. In relatively calm seas, bulge wave noise resulting from the marine vessel and tailbouy lurching can be somewhat minimized by controlling towing speeds. However, in rough sea conditions, such lurching may become so sever and uncontrollable that marine seismic surveying is interrupted until calmer seas return.

This lurching movement is communicated to the streamer which in turn causes the streamer to unpredictably accelerate and decelerate (hereinafter collectively referred to as "accelerations"). The resulting accelerations create extensional waves that propagate along the stress members of the streamer at about 1500 m/s. At each rigid connection between the stress members, spacers and other internal structure within the streamer, a number of lower velocity, mode converted energy waves are created that propagate within the streamer as well. Mode converted energy waves include very low velocity, perhaps 50 m/s, bulge wave energy that propagates within the streamer fluid and streamer skin. The extensionally-coupled bulge wave energy, along with other related forms of mode converted energy that may or may not result in a measurable deformation of the streamer skin, is recorded by the seismic detector within the streamer as noise (hereinafter collectively referred to as "bulge wave noise"). Once recorded by the seismic detector, the bulge wave noise severely contaminates the seismic reflection signals. Attempts to limit bulge wave noise levels have typically included the use of stretch sections and the application of low cut filters.

The stretch sections at both the front and back of the live section act as low pass filters that, under normal sea states, effectively attenuate or damp out undesired bulge wave noise above approximately 10 Hz. In higher sea states, the level of bulge wave energy increases at all frequencies, thereby contaminating the seismic signals even above 10 hz, often causing the seismic data collection operation to cease until lower sea states return. In addition, the historical trend of increasing seismic streamer length requires that additional stretch sections be used to achieve the same level of noise attenuation realized on shorter streamers. This has the undesirable effect of moving the near-offset detector group further away from the seismic source, resulting in a reduced ability to image the shallow geologic structures and possibly negatively effecting subsequent seismic data processing.

Attempts at attenuating the residual bulge wave noise below 10 Hz have traditionally required the use of low cut recording filters. However, the use of low cut recording filters has a major disadvantage in that the useable seismic bandwidth is also reduced, thus limiting the resolution of the recorded seismic reflection data. Therefore, there exists a need to attenuate bulge wave noise while minimizing resolution loss.

SUMMARY OF THE INVENTION

The present invention provides a method and apparatus for attenuating bulge wave noise without the disadvantages associated with low cut recording filters and stretch sections. In the preferred embodiment an accelerometer is secured between the lead-in section and the first live section. A second accelerometer may be secured between the tailbouy and the last live section.

The accelerometers detect forces exerted upon the live sections caused by the erratic lurching of the towing vessel, barovanes and tailbouy and generate corresponding electrical signals. During the inter-shot period (i.e., the period between the cessation of recording usable seismic energy waves and the firing of the seismic source) the signals recorded by the seismic detector groups and the accelerometers form an inter-shot set of signals i.e., inter-shot accelerometer signals and inter-shot seismic detector signals. The inter-shot set of signals train an adaptive filter. Adaptive filter training results in the evolution of inter-shot complex weights. The inter-shot complex weights modify the inter-shot accelerometer signals to approximate or model of the inter-shot bulge wave noise recorded by the live sections during the inter-shot period. Once the adaptive filter is trained to sufficiently minimize the error between the modelled signal (the inter-shot accelerometer signals and inter-shot complex weights) and the inter-shot seismic detector signals, the resulting complex weights derived during inter-shot training are fixed.

During the intra-shot period (i.e., the period from the moment the seismic source is fired until a sufficient amount of seismic energy having sufficient signal strength is recorded) an intra-shot set of signals are recorded. The intra-shot set of signals include intra-shot accelerometers signals and intra-shot seismic detector signals. The fixed inter-shot complex weights are combined with and modify the intra-shot accelerometer signals to approximate or model the intra-shot bulge wave noise present in the intra-shot set of signals. In this way, the intra-shot bulge wave noise model (intra-shot accelerometer signals and inter-shot complex weights) can be subtracted from the intra-shot seismic detector signals to substantially attenuate bulge wave noise from the intra-shot seismic detector signals.

DETAILED DESCRIPTION OF THE INVENTION

Figure 1:
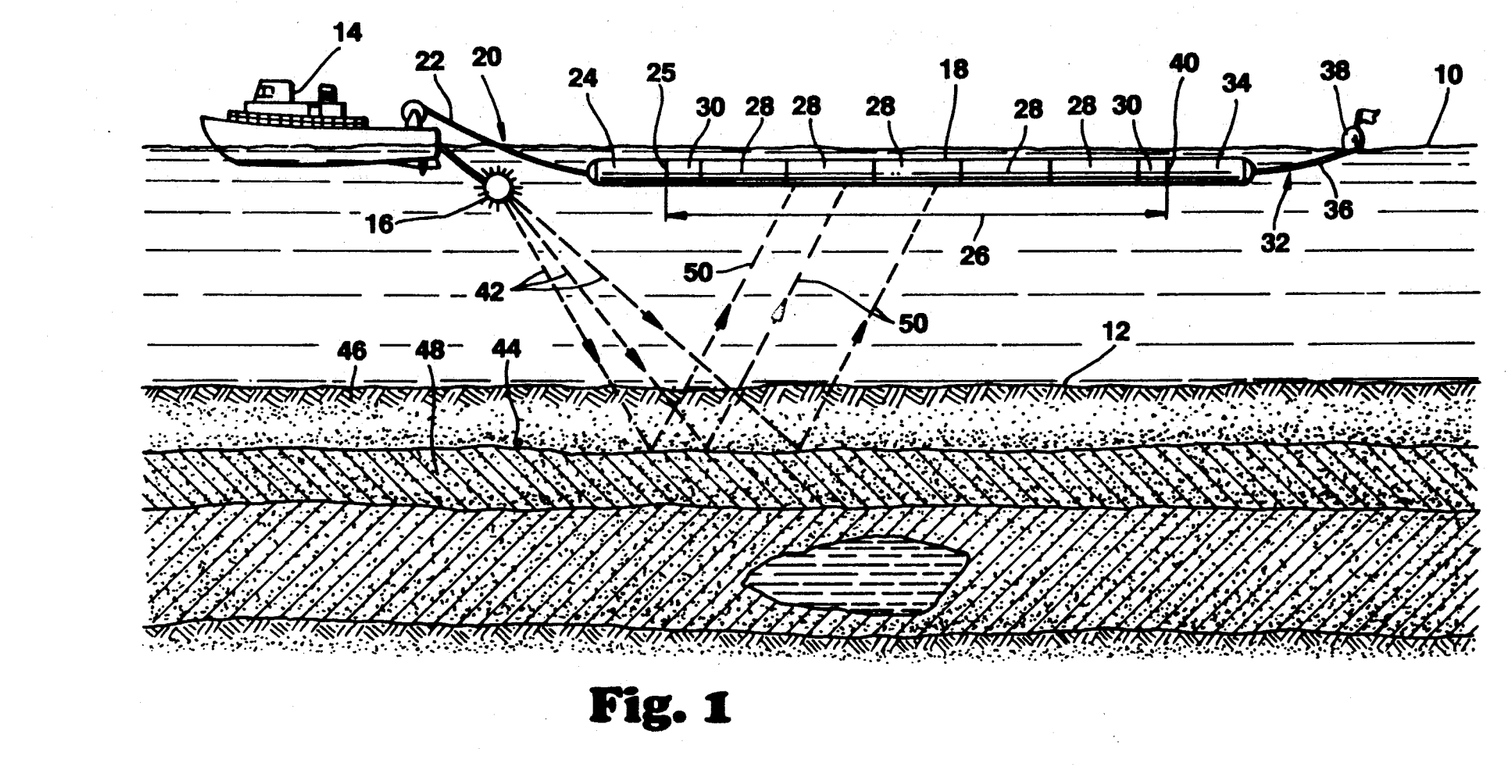
FIG. 1 is a diagrammatic representation of an earth cross-section under a body of water and a marine seismic survey method and apparatus of the present invention.

With reference now to the figures and in particular with reference to FIG. 1, there is depicted a diagrammatic illustration of a portion of the earth's surface under a body of water and a marine seismic survey being conducted. As may be seen, a marine seismic survey being conducted within in the body of water 10, wherein said body of water 10 may include, for example, a lake, sea or an ocean. The body of water 10 is overlying a portion of the earth's surface 12 which is being investigated utilizing the method and apparatus of the present invention.

A towing vessel 14 tows a seismic source 16, which is disposed at or near the surface of the body of water 10. The seismic source 16 comprises any source capable of generating seismic energy and may utilize an explosive device or a compressed air gun in order to generate seismic waves. The towing vessel 14 also tows a streamer 18. The streamer 18 is generally towed behind the vessel 14 at a select depth beneath the surface of the body of water 10. It will be understood by those skilled in the art that while a single streamer 18 is illustrated, multiple streamers may be simultaneously utilized in practicing the present invention.

The streamer 18 includes a cable lead-in section 22 and a stretch section 24. The front end 25 of the recording section 26 is secured to an end of the stretch section 24. The recording section 26 includes a plurality of live-sections 28, each live section having one or more seismic detectors (not shown) therein, and a pair of accelerometer sections 30 capturing the live sections 28 therebetween. A stretch section 34 and a cable section 36 are used for attachment of the tailbouy 38 to the far end 40 of the recording section 26.

The recording section 26 in FIG. 1 illustrates a plurality of live-sections 28 and a pair of accelerometer sections 30. However, it will be understood that for purposes of the present invention, the recording section 26 need only include a single longitudinal accelerometer, preferably secured between the forward stretch section 24 and the forwardmost live-section 28, and a single seismic detector in a single live section 28. It will be further understood that while a uniaxial accelerometer is suitable for purposes of the present invention, multiaxial accelerometers, such as a triaxial accelerometer, may be used (e.g., three, orthogonally arranged VM 508B piezoelectric accelerometers). If a multiaxial accelerometer is used, it is understood that some means of fixing the relative orientation of the transverse axes (normal to the latitudinal axis) should be employed. This may be accomplished by placing the multiaxial accelerometer in a gimbal or attaching an accompanying inclinometer designed to show its orientation relative to the earth's gravitational field (e.g., two Orbis KC2B clinometers rotated 180 degrees from each other on the transverse plane).

With continued reference to FIG. 1, during the intra-shot period, the seismic source 16 is fired so that seismic waves are generated. The seismic waves travel downward, as indicated at reference numeral 42, reflecting off various subterranean strata. For purposes of simplification, the seismic waves 42 are illustrated reflecting off interface 44 between strata 46 and 48. Of course, those skilled in the art will appreciate that seismic waves 42 will reflect and refract off each subterranean interface and that the actual reflections are substantially more complex than the simplified illustration presented. The reflected energy waves 50 travel upward and are recorded by the seismic detectors in the live-section in the form of electrical impulses.

The intra-shot period is defined as the elapsed time starting from the moment the seismic source 16 is fired until a sufficient amount of reflected waves 50 having sufficient signal strength have been recorded by the live-sections 28. Conversely, the inter-shot period is defined as the time between intra-shot periods, i.e., the time between the cessation of recording seismic energy waves and the firing of the seismic source.

Figure 2:
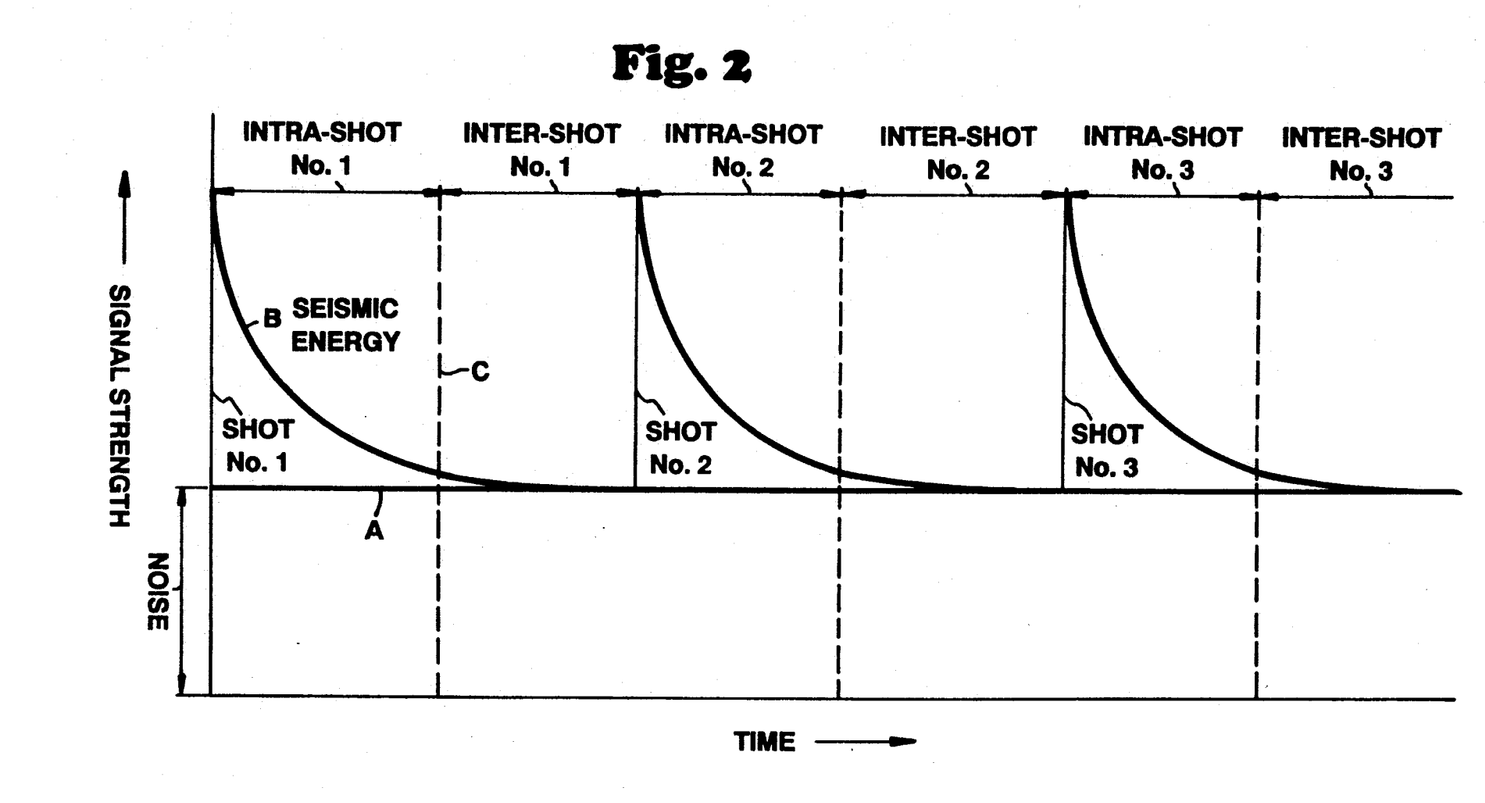
FIG. 2 is an illustration of the total seismic detector signal level (signal plus noise) recorded during successive inter-shot and intra-shot periods.

The concept of intra-shot and inter-shot periods is illustrated in FIG. 2. FIG. 2 plots three seismic source firings, i.e., SHOT #1, SHOT #2, and SHOT #3, in a time and signal strength domain. For purposes of illustration, line A represents cumulative noise at a constant strength. The firing of the seismic source generates a seismic energy pulse which begins each intra-shot period. This pulse is illustrated by a discrete spike in signal strength line B. Line B labeled SEISMIC ENERGY includes various signal components including the seismic source pulse, reflected waves and noise signals which include a bulge wave signal component. As time progresses, the signal strength of the seismic energy diminishes and line B approaches and merges with line A. For each seismic source firing, the duration of the respective intra-shot periods, illustrated by the lines labeled INTRA-SHOT #1, INTRA-SHOT #2, INTRA-SHOT #3 and the broken lines C, begins at some fixed time relative to the moment the seismic source is fired and preferably ends prior to the intersection of line B with line A. Each inter-shot period, illustrated by the lines labeled INTER-SHOT #1, INTER-SHOT #2, and INTER-SHOT #3, generally begins after each intra-shot period and ends prior to the firing of the seismic source.

As illustrated in FIG. 2, seismic detector signals recorded during the inter-shot period, represent predominately noise signals which include a bulge wave noise component and some weak seismic energy. Seismic sensor signals recorded during the intra-shot period include predominately the stronger seismic energy as well as noise which, again, includes a bulge wave noise component.

The length of a particular intra-shot period is generally pre-set and will depend upon, among other things, the depth of subsurface imaging desired. The intra-shot period should be of sufficient length to permit the seismic waves 42 to penetrate a plurality of subsurface strata, reflect and return to the area occupied by the streamer 18. In most marine seismic applications, the intra-shot period is between about 6 seconds and about 10 seconds in duration. After the intra-shot period and subsequent inter-shot period, the seismic source 16 is fired again.

Generally, the inter-shot period during a "line" is between about 4 seconds and about 8 seconds in duration. A "line" may be generally defined as the occurrence of a sequence of consecutive intra-shot and inter-shot periods while the streamer 18 is under tow in a predetermined direction at a predetermined speed so as to traverse a selected portion of the survey area.

After completing a line, the streamer is repositioned above the survey area, generally off-set from the area previously imaged, and another line is started. Firing and recording are resumed until the area overlying the subsurface strata of interest has been sufficiently imaged and the reflected data collected. It will also be appreciated that inter-shot periods occur before and after each line, during the repositioning of the streamer between lines, and before and after commencement of seismic surveying operations.

It is also understood that at present, continuous recording during the transition between the intra-shot and inter-shot periods in unavailable. This is due, in part, to limitations in present marine seismic recording systems which require a finite period of time to cycle between seismic records. However, data from the streamer sensors are available for computational use almost continuously.

In practicing the method of the present invention, accelerometers in the accelerometer sections 30 record accelerations experienced by recording section 26 during the inter-shot period—inter-shot accelerometer signals. Referring now to FIG. 1, the accelerometers record accelerations of the recording section 26 at ends 25 and 40 thereof. As previously discussed, recording section acceleration is the result of applied forces which include erratic lurching or movement of the towing vessel 14, barovanes (not shown) and the tailbouy 38. This movement is generally in response to such things as towing vessel acceleration, current, sea conditions, wind, and water salinity.

Simultaneously with inter-shot accelerometer recording, the seismic detectors within the streamer in the live-sections 28 record inter-shot seismic detector signals, which include a bulge wave noise component. The combination of inter-shot accelerometer signals and inter-shot seismic detector signals is referred to as the inter-shot set of signals.

As previously discussed, bulge wave noise is the direct result of erratic accelerations of the recording section 26. The inventors have found that because a relationship exist between recording section acceleration and bulge wave noise, a model of the bulge wave noise (using adaptively derived weights, as discussed in greater detail below) can be constructed and subsequently subtracted from intra-shot seismic detector signals to attenuate bulge wave interference.

Figure 3:
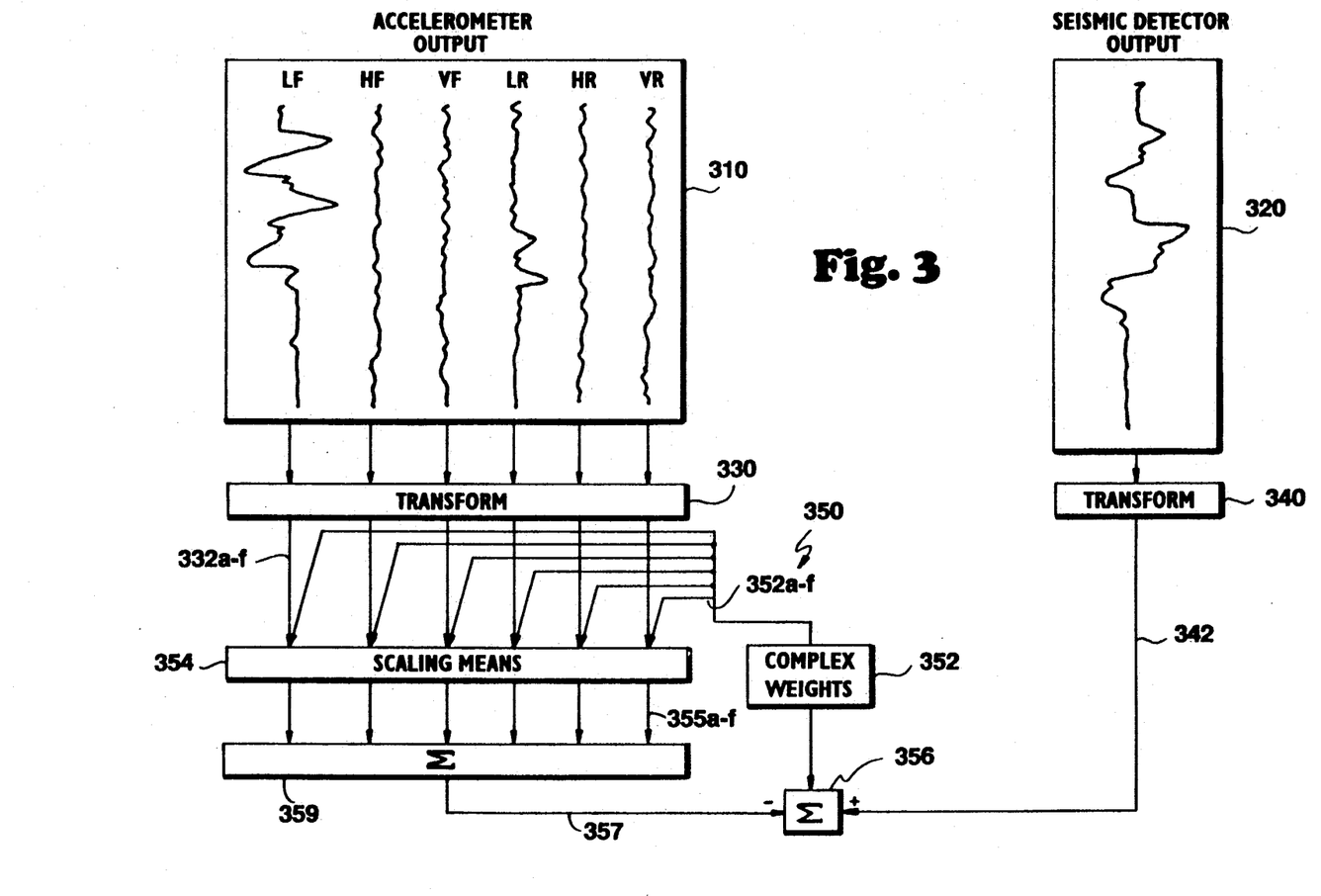
FIG. 3 is a schematic illustration of the inter-shot adaptive filtering process of the present invention.

FIG. 3 illustrates a schematic of the inter-shot adaptive filter process of the present invention. Reference numeral 310 depicts inter-shot accelerometer signals from two triaxial accelerometers, one at the front of the recording section and the other at the rear of the recording section. Each triaxial accelerometer has a laterally (L), a vertically (V) and a horizontally (H) oriented accelerometer. The letters F and R refer to the front and rear accelerometer respectfully. For example—the signal designated "LF" is the output signal from the laterally oriented-front accelerometer; the signal designated "HR" is the output signal from the horizontally oriented-rear accelerometer, and so forth.

Reference numeral 320 depicts seismic detector signals recorded during the inter-shot period at a particular 'group' position along the live streamer 26—inter-shot seismic detector signals. It will be understood that the inter-shot seismic detector signals 320 may be from a single seismic detector or from a number of seismic detectors connected in series to form a single signal at the 'group' center position. This process of combining numerous seismic detector signals together to form a single 'group' signal is commonly used in seismic exploration for the purpose of attenuating horizontally propagating noise energy. It will be further understood that the seismic detector signal recorded during the inter-shot period predominately consists of non-reflected seismic waves, such as bulge wave noise, and noise from other sources. In addition, the adaptive process, outlined below and in FIG. 3, for deriving the complex weights is preferably repeated for every 'group' output independently.

Inter-shot accelerometer signals 310 and inter-shot seismic detector signals 320 are transformed, and preferably Fourier transformed to the complex frequency domain, by transforming means 330 and 340 respectively. The transformed values 332a-f and 342 are input into an inter-shot adaptive processing loop 350. The purpose of the inter-shot adaptive processing loop 350 is to adaptively derive a model bulge wave noise signal 357 (from the summed products of the transformed outputs 332a through 332f and corresponding complex weights 352a through 352f) that will match the value of the transformed value 342. The inter-shot adaptive processing loop 350 is predicated upon adjusting complex weights 352a through 352f so that when the transformed outputs 332a through 332f are scaled by weights 352a through 352f, by scaling means 354, a scaled means product 355a through 355f is produced which, when summed by a combiner means 359 to form the model bulge wave noise signal 357 and then subtracted from the transformed output 342 by a combiner means 356, preferably cancels, in some optimized way, the value of the transformed output 342.

The period of time an iterative process requires to "adjust" complex weights 352a through 352f to achieve this end is commonly referred to as "adaptive filter training".

Preferably, adaptive filter training and noise attenuation is achieved by recording accelerometer and seismic detector outputs during the inter-shot periods which occur adjacent in time to the target signals acquired during a intra-shot period, such as is illustrated in FIG. 2. As such, the duration of adaptive filter training should generally decrease as the seismic surveying line progresses. This is so because the inter-shot adaptive filter process is not totally redundant. In other words, assuming boat speed, streamer drag, and environmental conditions, such as sea state, current, etc. remain relatively constant during the line, greater variances in the adjustment or "bracketing" of complex weights should occur during the initial training periods. Once the complex weight values are bracketed during these initial training periods by the inter-shot adaptive loop 350, subsequent training periods should produce only minor changes thereto and thus may be shorter in duration.

Figure 4:
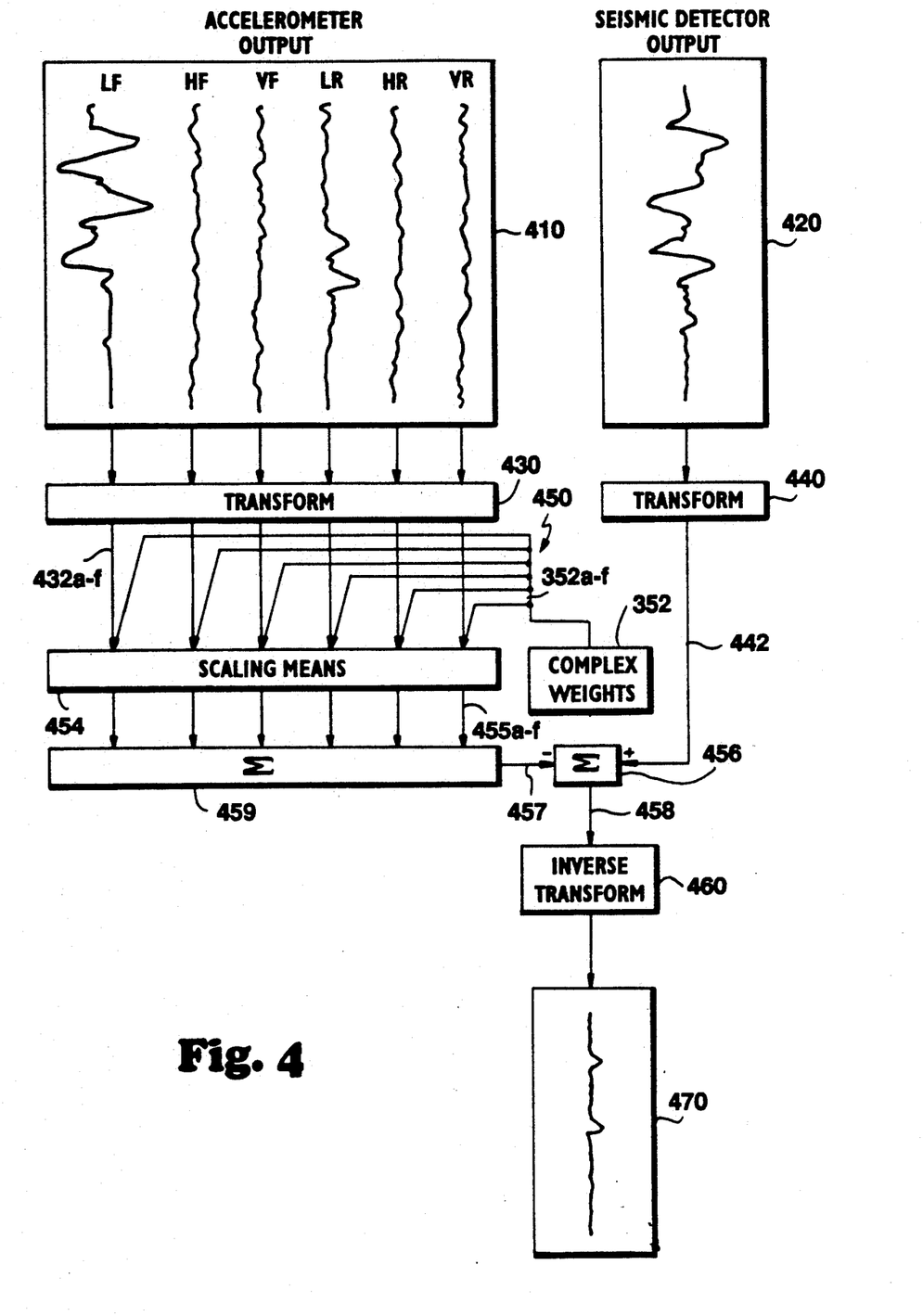
FIG. 4 is a schematic illustration of the intra-shot adaptive filtering process of the present invention.

FIG. 4 illustrates a schematic of the intra-shot adaptive filter application process of the present invention. Intra-shot accelerometer signals 410 are triaxial accelerometer outputs, recorded during the intra-shot period. Intra-shot seismic detector signals 420 is the seismic detector signals recorded at a particular streamer sensor "group" during the intra-shot period which includes signals from reflected seismic energy as well as a noise component. As with signal 320, it will be understood that signal 420 may be from a single seismic detector or from a group of seismic detectors connected in series to form a single output signal. The combination of intra-shot accelerometer signals and intra-shot seismic detector signals is referred to as the intra-shot set of signals.

Intra-shot accelerometer signals 410 and intra-shot seismic detector signals 420 are transformed, and preferably Fourier transformed to the complex frequency domain, by transforming means 430 and 440 respectively. The transformed values 432a through 432f and 442 are input into an intra-shot adaptive filter application process 450. The purpose of the intra-shot adaptive process 450 is to construct a model bulge wave noise signal 457 using the inter-shot complex weights and transformed values 432a-f which may then be subtracted from transformed value 442 to produce a substantially bulge wave noise free reflected seismic energy component 458 for further processing.

The intra-shot adaptive filter application process 450 accomplishes this by first scaling transformed signals 432a through 432f by complex weights 352a through 352f using scaling means 454 and then summing scaled signals 455a through 455f using combiner means 459 to form the modeled signal 457. This modelled noise signal 457 is then subtracted from transformed output 442 by combiner means 456 to yield component 458.

The complex weights 352 are preferably the inter-shot weights 354a-f derived during inter-shot periods of both before and after the particular intra-shot period being modelled. For example, referring now to FIG. 2, if the target or application seismic signals 420 are recorded during intra-shot period #2, complex weights 452 are derived using the inter-shot accelerometer signals 310 and inter-shot seismic detector signals 320 from inter-shot periods #1 and #2.

Component 458 is then inverse transformed, and preferably inverse Fourier transformed, by inverse transform means 460. The result of inverse transform means 460 is a seismic detector signal 470 which is substantially free of bulge wave noise.

Those skilled in the art will recognize that the intra-shot adaptive filtering may be accomplished in the field or at more centralized processing sites. Furthermore, although the invention has been described with reference to specific embodiments, this description is not meant to be construed in a limiting sense. Various modifications of the disclosed embodiments as well as alternative embodiments of the invention will become apparent to persons skilled in the art upon reference to the description of the invention. It is therefore contemplated that the appended claims will cover any such modification or embodiments that fall within the true scope of the invention.

We claim:

1. A method of attenuating bulge wave noise in seismic data comprising:

transforming a first accelerometer signal component of an intra-shot set of signals;

transforming a first seismic detector signal component of an intra-shot set of signals, wherein the first seismic detector signal component contains a first bulge wave noise component;

transforming a second accelerator signal component of an inter-shot set of signals, said inter-shot set of signals obtained in the period established between successive periods in which said intra-shot set of signals was obtained;

transforming a second seismic detector signal component of an inter-shot set of signals, wherein the second seismic detector signal component contains a second bulge wave noise component;

deriving inter-shot complex weights from the inter-shot set of signals; and attenuating the first bulge wave noise component from the intra-shot set of signals by combining the inter-shot complex weights with the intra-shot set of signals.

2. The method of claim 1 wherein the first accelerometer signal component and the first seismic detector signal component are independent Fourier transformed.

3. The method of claim 1 wherein the second accelerometer signal component and the second seismic detector signal component are independently Fourier transformed.

4. The method of claim 1 wherein the inter-shot complex weights are derived by an inter-shot adaptive filter.

5. The method of claim 1 wherein the first bulge wave noise component is attenuated by combining the inter-shot complex weights with the intra-shot set of signals in an intra-shot adaptive filter.

6. A method of marine seismic surveying comprising:
generating seismic waves utilizing a seismic energy source;
collecting an intra-shot set of signals with at least one seismic detector and at least one accelerometer in a marine streamer, wherein the intra-shot set of signals includes a first seismic signal component having a first bulge wave noise component and a first accelerometer signal component; and
collecting an inter-shot set of signals with the marine streamer, wherein the inter-shot set of signals includes a second seismic signal component having a second bulge wave noise component and a second accelerometer signal component said inter-shot set of signals obtained in the period established between successive periods in which said intra-shot set of signals was obtained.

7. The method of claim 6 further including the step of deriving inter-shot complex weight from the inter-shot set of signals.

8. The method of claim 7 wherein the inter-shot complex weights are derived by an inter-shot adaptive filter.

9. The method of claim 7 further including the step of attenuating the first bulge wave noise component from the intra-shot set of signals by combining the inter-shot complex weights with the intra-shot set of signals.

10. The method of claim 9 wherein the first accelerometer signal component is attenuated by combining the inter-shot complex weights with the intra-shot set of signals in an intra-shot adaptive filter.

* * * * *

UNITED STATES PATENT AND TRADEMARK OFFICE
CERTIFICATE OF CORRECTION

PATENT NO. : 5,251,183
DATED : 10/5/93
INVENTOR(S) : Joseph R. McConnell and George Wood It is certified that error appears in the above-identified patent and that said Letters Patent is hereby corrected as shown below:

Column 10,
In claim 7, line 2, "weight" should read --weights--.

Signed and Sealed this

Fifth Day of April, 1994

BRUCE LEHMAN

Attest:

Attesting Officer    Commissioner of Patents and Trademarks